(12) United States Patent
May

(10) Patent No.: US 9,211,776 B2
(45) Date of Patent: Dec. 15, 2015

(54) AIR SPRING WITH STEPPER MOTOR DRIVEN PNEUMATIC VALVE

(71) Applicant: STEMCO Kaiser Incorporated, Millington, MI (US)

(72) Inventor: Lutz May, Berg (DE)

(73) Assignee: STEMCO KAISER INCORPORATED, Millington, MI (US)

( * ) Notice: Subject to any disclaimer, the term of this patent is extended or adjusted under 35 U.S.C. 154(b) by 0 days.

(21) Appl. No.: 14/133,754

(22) Filed: Dec. 19, 2013

(65) Prior Publication Data

US 2014/0225345 A1 Aug. 14, 2014

(30) Foreign Application Priority Data

Feb. 8, 2013 (EP) ..................................... 13154685

(51) Int. Cl.
*B60G 11/27* (2006.01)
*B60G 17/052* (2006.01)
(Continued)

(52) U.S. Cl.
CPC ............ *B60G 17/0521* (2013.01); *B60G 11/27* (2013.01); *B60G 17/018* (2013.01); *B60G 17/0155* (2013.01); *B60G 17/0182* (2013.01); *B60G 17/01933* (2013.01);
(Continued)

(58) Field of Classification Search
CPC ............. B60G 11/37; B60G 2202/152; B60G 17/0565
USPC .............. 280/5.5, 5.507, 5.512, 5.514, 5.515, 280/6.151, 6.154, 6.157, 6.159; 701/37–38, 701/40; 267/64.16, 64.27
See application file for complete search history.

(56) References Cited

U.S. PATENT DOCUMENTS

| | | | | |
|---|---|---|---|---|
| 5,075,855 A | * | 12/1991 | Sugasawa et al. | ............... 701/37 |
| 5,671,142 A | * | 9/1997 | Tatarazako | ....................... 701/37 |

(Continued)

FOREIGN PATENT DOCUMENTS

| | | | |
|---|---|---|---|
| DE | 10 2006 017 275 A1 | 10/2007 | ....... B60G 17/01933 |
| DE | 1845278 A1 | 10/2007 | ....... B60G 17/01933 |
| DE | 10 2008 064 647 A1 | 2/2010 | ........... B60G 17/019 |
| EP | 1449688 A2 | 8/2004 | ................ F16F 9/04 |
| EP | 2366972 A2 | 9/2011 | |
| JP | S5926636 | 2/1984 | ................ F16F 9/04 |
| JP | 2002293122 | 10/2002 | ................ F16F 9/04 |

(Continued)

OTHER PUBLICATIONS

Ayanori Shishido, Speed Sensitive Type Vehicle Height Adjusting Mechanism and Controlling Method Therefor, Oct. 9, 2002, JPO, JP 2002-293122 A, Machine Translation of Description.*

*Primary Examiner* — James English
(74) *Attorney, Agent, or Firm* — Perkins Coie LLP

(57) ABSTRACT

The subject invention reveals an air spring arrangement comprising: a first mounting member, a second mounting member, an air spring volume, a height sensor, a controllable valve, a position controllable drive, wherein the first mounting member and the second mounting member are arranged so as to mount the air spring volume to corresponding vehicle members, wherein the height sensor is arranged so as to sense a distance between the first mounting member and the second mounting member, wherein the controllable valve is arranged so as to connect the inside of the air spring volume with the outside of the air spring volume, wherein the position controllable drive is arranged so as to drive the controllable valve with respect to an opening grade of the controllable valve, and wherein the position controllable drive is controlled based on the sensed distance between the first mounting member and the second mounting member.

19 Claims, 3 Drawing Sheets

(51) Int. Cl.
*B60G 17/015* (2006.01)
*B60G 17/018* (2006.01)
*B60G 17/019* (2006.01)
*B60G 17/048* (2006.01)
*F16F 15/00* (2006.01)
*F16F 9/05* (2006.01)
*F16F 9/32* (2006.01)

(52) U.S. Cl.
CPC ....... *B60G 17/0485* (2013.01); *B60G 17/0523* (2013.01); *F16F 9/05* (2013.01); *F16F 9/3292* (2013.01); *F16F 15/002* (2013.01); *B60G 2202/152* (2013.01); *B60G 2202/44* (2013.01); *B60G 2202/442* (2013.01); *B60G 2206/011* (2013.01); *B60G 2400/252* (2013.01); *B60G 2500/204* (2013.01); *B60G 2600/187* (2013.01); *B60G 2600/1875* (2013.01); *B60G 2600/76* (2013.01)

(56) References Cited

U.S. PATENT DOCUMENTS

| | | | | |
|---|---|---|---|---|
| 5,921,532 | A * | 7/1999 | Pierce et al. | 267/64.19 |
| 6,519,517 | B1 * | 2/2003 | Heyring et al. | 701/37 |
| 2003/0001346 | A1 * | 1/2003 | Hamilton et al. | 280/5.515 |
| 2004/0245687 | A1 * | 12/2004 | Sendrea et al. | 267/64.16 |
| 2006/0267297 | A1 * | 11/2006 | Nordmeyer et al. | 280/5.515 |
| 2008/0048405 | A1 * | 2/2008 | DeLorenzis et al. | 280/6.159 |
| 2010/0096819 | A1 | 4/2010 | Flynn et al. | 280/6.153 |
| 2011/0160959 | A1 * | 6/2011 | Knox et al. | 701/37 |
| 2012/0056616 | A1 | 3/2012 | May | 324/207.15 |
| 2012/0086178 | A1 * | 4/2012 | Brookes et al. | 280/6.157 |

FOREIGN PATENT DOCUMENTS

| | | | | |
|---|---|---|---|---|
| WO | WO 03/029687 A1 | 4/2003 | | F16F 9/04 |
| WO | WO 2010/141472 A1 | 12/2010 | | F16F 9/04 |

* cited by examiner

AIR SPRING WITH STEPPER MOTOR DRIVEN PNEUMATIC VALVE

This application claims benefit of European Patent Application Serial No. EP 13154685.5, filed on Feb. 8, 2013. The teachings of European Patent Application EP 13154685.5 are incorporated herein by reference in their entirety.

FIELD OF THE INVENTION

The present invention relates to an air spring and in particular to an air spring having a controllable valve and a position controllable drive for driving the controllable valve.

BACKGROUND OF THE INVENTION

Active air springs are used extensively in a wide range of industrial applications, but are mainly in transportation applications. Such "transportation applications" include, but are not limited to, use in passenger cars, vans, light trucks, commercial trucks, military vehicles, railroad locomotives and vehicles, military and commercial aircraft (airplanes), off-road or off-highway vehicles, farming equipment, construction equipment, mining equipment and vehicles, and other power-driven systems.

A modern active air spring system, also called smart air spring or air spring level unit (ASLU) may require the individual functions of an air spring, a height sensor, a gas pressure sensing device, a pneumatic valve, and electronics that control the active air spring. The main function of a smart and active air spring is to actively adapt and to optimize the physical properties of the air spring, for example including the working height and the damping specifications, to enhance its performances while the operation conditions are changing.

DE 10 2006 017 275 A1 and EP 1845278 A1 describe an air spring having an integrated positioning device, wherein the distance between two parts of the air spring can be measured by an analogue proximity sensor. Commonly used proximity sensors are, for example, based on an ultrasonic measurement principle which is very sensitive in noisy and vibrating environments, as the acoustic noise and the ultrasonic measurement principle are based on the same physical principle, i.e. sound propagation. These pneumatic air springs have an integrated height measuring device, a pressure chamber or an inner chamber. The exterior of the inner chamber is aligned in the analog proximity sensor and a metal plate is arranged opposite to the interior of the proximity sensor. The proximity sensor and the metal plate are formed pre-adjustable to each other.

DE 10 2008 064 647 A1 describes an air spring for a vehicle having a measuring device, which measuring device may transmit data and energy via predetermined and fixed distance contactless. This pneumatic cushioning equipment has a base unit which has a pressure source and a valve unit which has an air supply made of non-metallic material, particularly plastic. A switching valve of the base unit is provided between the pressure source and appropriate valve unit of the arranged air supply.

EP 2 366 972 and U.S. Pat. Publication No. 2012/0056616 A1 describe a sensor device for height measurement in an air spring and a corresponding method allowing determining changes in a working stroke of the air spring. These publications more specifically disclose a sensor device for a height measurement, comprising: a transceiving coil arrangement including at least one transceiving coil; a transmitting drive unit; a receiver unit; a reference coil arrangement; and a reference control unit, wherein the transceiving coil arrangement is coupled to both the transmitting drive circuit and the receiver unit, wherein the reference control unit is coupled to the reference coil arrangement, wherein the reference coil arrangement is movably positioned with respect to the transceiving coil arrangement, wherein the drive unit is adapted to drive the transceiving coil arrangement with an AC power signal of a predetermined duration for generating a magnetic field, wherein the reference control unit is adapted for accumulating energy out of the generated magnetic field and for generating a reference signal based on an amount of the accumulated energy, and wherein the receiver unit is adapted for receiving the reference signal and for outputting a signal for determining a distance between the transceiving coil arrangement and the reference coil arrangement based on at least one out of a group, the group consisting of the reference signal and the duration of the AC power signal.

SUMMARY OF THE INVENTION

According to an exemplary embodiment of this invention, there is provided an air spring arrangement comprising a first mounting member, a second mounting member, an air spring volume, a height sensor, a controllable valve, and a position controllable drive, wherein the first mounting member and the second mounting member are arranged so as to mount the air spring volume to corresponding vehicle members, wherein the height sensor is arranged so as to sense a distance between the first mounting member and the second mounting member, wherein the controllable valve is arranged so as to allow a connection between the inside of the air spring volume and the outside of the air spring volume, wherein the position controllable drive is arranged so as to drive the controllable valve with respect to an opening grade of the controllable valve, wherein the position controllable drive is controlled based on the sensed distance between the first mounting member and the second mounting member.

Thus, an air spring arrangement is provided which allows a proper controlling of the pressure within the air spring volume. In particular, the position controllable drive in combination with a controllable valve allows controlling the opening grade of the controllable valve. In particular, the controllable valve may not only provide two discrete states, i.e. entirely open and entirely closed, but may also provide intermediate states. Thus, it is possible to smoothly control the pressure within the air spring volume, and the air spring volume as such, respectively. The height sensor may provide respective information on the state of the air spring arrangement, in particular the distance between the first mounting member and the second mounting member, so that based on the determined distance, the position controllable drive may control the controllable valve. With this respect, it is for example possible to maintain a particular distance, even if having changing environment conditions, or to automatically adapt the height according to respective requirements.

According to an exemplary embodiment of the invention, the controllable valve and the position controllable drive form an electrically powered motor driven valve. Thus, it is possible to properly drive the controllable valve by electric power, and in particular to control the opening grade of the controllable valve by the position controllable drive.

According to an exemplary embodiment of the present invention, the controllable valve in combination with the position controllable drive has a self-holding characteristic, such that the controllable valve maintains its opening grade in absence of power. Thus, it is possible to maintain a particular state of the controllable valve without applying power to the drive of the controllable valve. Even if maintaining a particular opening grade of the valve over a long time, no additional power, in particular electrical power, is required. As the controllable valve in combination with the position controllable drive has a self-holding characteristic, even the absence of power maintains the opening grade, so that the air spring arrangement may save a considerable amount of energy, in particular electrical energy. This may be of relevance in particular when bringing the air spring arrangement into an operation condition before starting the vehicle's engine and power generator of the vehicle, respectively.

According to an exemplary embodiment of the subject invention, the characteristic between the position controllable drive and an opening grade of the controllable valve is predefined. Thus, it is possible to precisely control the controllable valve by the position controllable drive, as the opening grade of the controllable valve is known, when knowing the position of the position controllable drive. In particular, it is possible to precisely control the position controllable drive so as to precisely obtain an opening grade of the controllable valve, so that a feedback from the controllable valve for controlling purposes is not required any longer.

According to an exemplary embodiment of this invention, the height sensor and the position controllable drive each comprise an inter-compatible bus interface to be connected to a control unit. Thus, it is possible to couple the height sensor as a sensing device and the position controllable drive as a driving device to a common bus to be connected to a control unit. In particular, it is possible to transmit the sensed value of the height sensor to the controlling unit via the bus, wherein the controlling instructions for the position controllable drive may be transferred via the same bus. Accordingly, only a common bus connection is required to interconnect the height sensor, the position controllable drive, and a controlling unit.

According to an exemplary embodiment of the present invention, the air spring arrangement further comprises a controlling device, wherein the controlling device is adapted for controlling the position controllable drive based on a set value and a distance or height sensed by the height sensor. Thus, it is possible to control the pressure within the air spring volume and the stroke of the air spring arrangement based on the sensed distance and a set value, which set value may be for example a predetermined pressure value or a predetermined stroke. In other words, the pressure within the air spring may be increased when the sensed distance is smaller than the predetermined distance or stroke, whereas the pressure within the air spring volume may be reduced, when the sensed distance is larger than the set value of a predetermined distance or stroke.

According to another exemplary embodiment of the subject invention, the controlling device comprises a local controlling unit being allocated to the air spring arrangement, and a central vehicle controlling unit being allocated to a plurality of air spring arrangements of a vehicle, wherein the local controlling unit is adapted to control the position controllable drive based on local set values, and the central vehicle controlling unit is adapted to control the position controllable drive based on central set values. Thus, it is possible to control the air spring arrangement locally based on the local set value, like for example a nominal stroke of an air spring which may be maintained by the local control unit, whereas the central vehicle control unit may control the entire vehicle condition by controlling the plurality of air spring arrangements of the vehicle. For example, the local control unit may be used to maintain a nominal stroke, in particular when having an uneven load of the vehicle, whereas the central vehicle control unit may control the air spring arrangements of the vehicle according to dynamic impacts, like for example road conditions or driving conditions, e.g. curved tracks.

According to a further exemplary embodiment of this invention, the air spring arrangement further comprises an elastic bellow, wherein the first mounting member, the second mounting member, and the elastic bellow define the air spring volume. Thus, the air spring volume may be defined by the elastic bellow as well as the mounting members. The mounting members may be mounted to the elastic bellow. The elastic bellow may allow the mounting members to be moved with respect to each other. The elastic bellow allows increasing and decreasing the air spring volume upon increasing the pressure within the air spring volume. It should be understood, that the number of elements defining the air spring volume is not limited to the first and second mounting member, as well as the elastic bellow, but may further comprise additional elements. For example, it is also possible to provide a two-part bellow having an intermediate element, wherein a first elastic bellow may be mounted to the first mounting member and the intermediate member, and the second elastic bellow may be mounted to the intermediate mounting member and the second mounting member, so as to have a two-part elastic bellow arrangement. As an alternative, the air spring arrangement instead of an elastic bellow may have for example a sealed telescopic section.

According to still another exemplary embodiment of the subject invention, the controllable valve and the position controllable drive together are mounted to one of the first mounting member and the second mounting member. Thus, it is possible to directly provide the controllable valve and the position controllable drive to the mounting unit of the air spring arrangement. The controllable valve and the position controllable drive may be designed as a single unit. As the controllable valve and the position controllable drive may be designed very compact, it may be possible to provide the controllable valve as well as the position controllable drive in a recess or cavity of either the first mounting member or the second mounting member. It should be understood that it is also possible to provide two controllable valve/position controllable drive units, wherein one unit may be mounted to the first mounting member, and the second unit may be mounted to the second mounting member. Nevertheless, it may be of relevance to provide the controllable valve and the position controllable drive interacting with each other to that mounting member, which is mounted to the vehicle part providing the driving power and the bus, respectively.

According to another exemplary embodiment of the present invention, the position controllable drive is a stepper motor and the controllable valve is a stepper motor driven pneumatic valve. Thus, it is possible to control the stepper motor with a controlling signal, for example a predefined number of impulses and to exactly know the stepper motor position, so that also the opening grade of the controllable valve is known. A stepper motor does not require a sensor for measuring the position of the rotor over the stator. Thus, without a feedback loop from the valve the opening grade of the valve is known, as it is predefined, e.g. via a look up table including the stepper motor rotor position versus the opening grade of the valve. Accordingly, it is possible to exactly control the opening grade of the controllable valve by selecting the respective proper pattern of a controlling signal for the stepper motor.

In accordance with a further exemplary embodiment of this invention, the position controllable drive is an electric motor with a position feedback, and the controllable valve is a position feedback motor driven pneumatic valve. Thus, the electrical motor may be driven by a driving signal, wherein the controlling unit may receive the position feedback of the electric motor, so as to provide a feedback loop to control the position of for example the rotor of the electric motor. By controlling the exact position of the rotor of the electric motor, also the exact opening grade of the controllable valve is known, so that it is possible to exactly control the opening grade of the controllable valve based on the position feedback of the electric motor as the position controllable drive.

According to an additional exemplary embodiment of this invention, the position controllable drive and the controllable valve are coupled such that the position controllable drive generates a linear movement of a valve piston of the controllable valve. Thus, it is possible to move the piston in forward and backward position so as to control the opening grade of the controllable valve. The linear movement of the valve piston by the position controllable drive may be obtained by coupling a stepper motor to a gear transforming a rotational movement into a linear movement. However, it is also possible to provide a linear drive as a position controllable drive, wherein such linear drive may be coupled to the valve piston of the controllable valve. The linear movement may have a linear characteristic or may have a non-linear characteristic. The latter may allow a larger stroke when opening the valve.

In accordance with another exemplary embodiment of the subject invention, the position controllable drive and the controllable valve are coupled such that the position controllable drive generates a rotational movement of a valve piston of the controllable valve. Thus, it is possible to rotate the valve piston according to the rotation of the position controllable drive. It should be noted that for example a rotor of a motor as the position controllable drive may directly drive the rotational movement of the valve piston. However, the rotor of such a stepper motor or controllable drive in general may be coupled to the valve piston via a gear having a transmission ratio being adapted to the controlling requirements. The rotational movement may have a linear characteristic or may have a non-linear characteristic. The latter may allow a larger stroke when opening the valve.

In another exemplary embodiment of the invention, the controlling device comprises an estimation unit being adapted for estimating a required control pattern for controlling the position controllable drive based on the sensed distance, the set value, and the characteristic between the position controllable drive and the opening grade of the controllable valve, wherein the control device is adapted to control the position controllable drive based on the estimated control pattern so as to avoid control iterations. Thus, it is possible to estimate in advance the required opening grade and the required opening duration of the controllable valve so as to obtain a predetermined condition of the air spring arrangement, which is to be obtained. For example, the controlling unit, and in particular the estimation unit, may comprise an algorithm, which determines based on the sensed distance of the height sensor as well as set value and the known characteristic between the position controllable drive and the opening grade of the controllable valve a respective opening duration of the controllable valve, so that a overshooting may be avoided. Such a controlling pattern may, for example, also consider reaction times of the control unit as well as reaction times of the mechanical elements.

According to a further exemplary embodiment of this invention, the estimation unit is adapted to self-learning from previously estimated control patterns. Thus, it is possible to educate the estimation unit based on particular properties of the air spring arrangement, which may be for example manufacturing tolerances or a certain leakage of the air spring arrangement. The self-learning process may also consider particular driving conditions or road conditions, which may be detected by the height sensor.

According to another exemplary embodiment of this invention, the air spring arrangement further comprises a data bus, wherein at least two of the height sensor, the position controllable drive and the controlling device are communicatively connected to the data bus. Thus, it is possible to use a common data bus for easy communication between the units. In particular it is possible to transfer a height measurement value via the bus to the control unit and to transfer the control signal from the control unit to the position controllable drive via the same data bus. It should be noted that there may be provided an interface for coupling an external control unit to the data bus for providing e.g. set values etc., which can be entered by way of e keyboard or any other input device.

According to still another exemplary embodiment of the present invention, the air spring system comprises a plurality of air spring arrangements as described above, wherein the plurality of air spring arrangements with respect to at least one parameter are commonly controlled. Thus, a central control unit may control the mutual relation of the air spring arrangements, e.g. with respect to a load distribution.

According to another exemplary embodiment of the subject invention, the air spring system further comprises a data bus, wherein height sensors, position controllable drives, local controlling units and a central controlling unit are communicatively connected to the data bus, wherein the central controlling unit is adapted to commonly control the plurality of air spring arrangements with respect to at least one parameter, and the local controlling units are adapted to locally control the plurality of air spring arrangements with respect to at least one parameter. Thus, it is possible to control some parameters centrally, like for example a mutual relation of the air spring arrangements or a parameter considering the general road condition and/or a load distribution, and at the same time to control some parameters locally, like for example a min or max pressure, min or max stroke or position.

It should be noted that the above features may also be combined. The combination of the above features may lead to synergetic effects, even if not explicitly described in detail. These and other aspects of the present invention will become apparent from and elucidated with reference to the embodiments described hereinafter.

BRIEF DESCRIPTION OF THE DRAWINGS

Exemplary embodiments of the present invention will be described in the following with reference to the following drawings.

Figure 1:
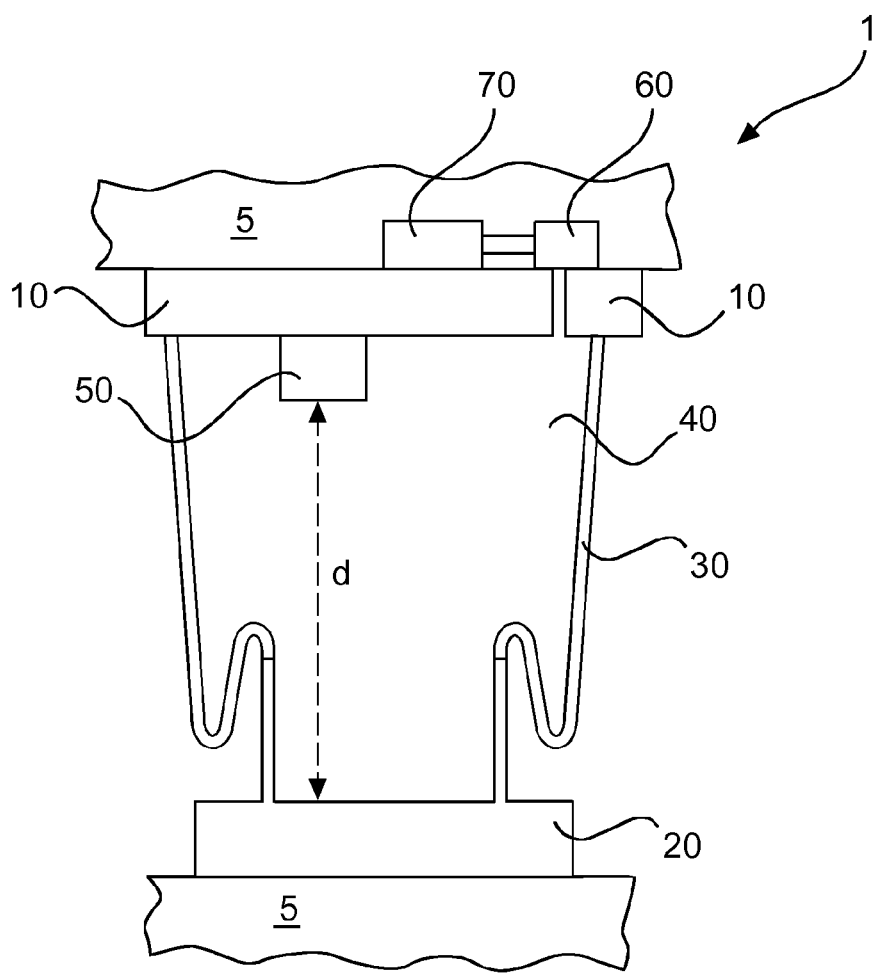
FIG. 1 illustrates a general build-up of an air spring arrangement according to an exemplary embodiment of the invention.

The reference numerals which are utilized in the drawings are as follows:
- 1 air spring arrangement
- 5 vehicle parts
- 7 data bus
- 10 first mounting member
- 20 second mounting member
- 30 elastic bellow
- 40 air spring volume
- 50 height sensor
- 60 controllable valve, pneumatic valve
- 61 valve piston
- 63 valve inlet
- 64 valve outlet
- 70 position controllable drive, stepper motor
- 80 controlling device
- 81 local controlling unit
- 82 central controlling unit
- 83 estimation unit
- C1 step/opening grade characteristic
- C2 step/opening grade characteristic

DETAILED DESCRIPTION OF THE INVENTION

The present invention provides a combination of a height sensor, the use of a position controllable drive, e.g. a stepper motor, to opening and closing a pneumatic valve as a new and unique feature in a smart air spring device, which will be described in more detail in the following. The combination of an integrated height sensor and a stepper motor driven pneumatic valve is the combined use of two functional modules, a height sensor, and a stepper motor driven pneumatic valve in an air spring device. In general, the two functional modules are a height sensor and a position controllable drive driven valve in an air spring arrangement. The combination of such a position controllable drive and a controllable valve provides synergetic effects which allow a smart controlling of an air spring arrangement. In order to facilitate the communication between the sensor elements and the drive elements with a controlling unit, the functional modules may be provided with a build-in serial digital communication interface, for example a CAN bus, a basic CAN bus, and/or a LIN bus. Thus, it is very easy to build a fully functional system by simply connecting together with each other the digital serial communication bus and make the wired bus connections available to the user as the main and the only required communication interface. However, it may also be possible to provide a system having not only one communication interface, but also a plurality of parallel communication interfaces. In one embodiment of the invention, no other electronical interface circuits are required to establish a fully functional active air spring system. The stepper motor driven pneumatic valve, or in general the position controllable drive driven valve can precisely adjust the air flow, that will be passed through a valve back and forth. In particular, the amount of air over time may be adjusted. The height sensor may be integrated into the active air spring arrangement, wherein the height sensor may sense the exact position or working length of the air spring arrangement, in particular of the first mounting member and the second mounting member. When working together, these two functional modules may allow the realization of a very smooth controlled active air spring having an increased comfort, reduced wear and tear, and reduced pressured air wastage. Traditionally driven pneumatic valves, for example hydraulic powered or electrically powered solenoid valves may be limited to only fully open a pneumatic valve or to fully close the pneumatic valve. This results into a digital-like and very abrupt-like behaviour of the valve.

The subject invention further provides for a self-holding system, which means a substantial reduction of the required electrical power consumption. A relevant features of the stepper motor valve drive or in general the position controllable drive is that the valve will not change its physical position when switching off the power, in particular electrical power from the position controllable drive. In solenoid driven pneumatic valves, the valve position may change, because of the difference in air pressure inside the valve, when the electric power is cut off the solenoid. Consequently, the electrical power of the solenoid has to be provided constantly at all time during the time when the valve is in operation. However, with the present invention, this is not the case for a position controllable drive driven valve according to the invention. The electrical power is only required when changes have to be made to the valve position. In average, the present invention provides a reduced electrical power consumption, resulting in savings of more than 98% over commercial truck applications, which means a factor 50.

Further, the combination of a position controllable drive and a controllable valve allows a low mounting height, which allows integration into an air spring lid or an air spring mounting member. The position controllable drive together with the controllable valve has a very low profile in the area of e.g. 10 mm. Therefore, such a device may easily be fitted to for example the top plate (lid) of the air spring without having to increase the thickness (height) of the lid itself. The result of this will be that the height sensor and the stepper motor driven pneumatic valve, or in general the position controlled drive driven valve, will fit in the inside of the air suspension unit, both mounted into the lid. Traditional pneumatic valves used in commercial trucks are often of huge size, so that the present invention provides a reduced mounting volume.

The above features allow the definition of an exact amount of air flow passing through the valve. The position controllable drive together with the controllable valve may gently open and close the air passages in the valve system, or, when driven very fast, open and close them like a traditional solenoid driven pneumatic valve. One and the same combination of a position controllable drive and a controllable valve can be used in pneumatic applications that have different air throughput requirements. Further, a low electric current consumption in the area of 10 to 100 mA can be realized. The physical size of the pneumatic mechanics is much smaller than that of a traditional solenoid driven pneumatic valve for an air spring.

Considering the above, FIG. 1 illustrates the general structure of an air spring arrangement according to an exemplary embodiment of the present invention. The air spring 1 comprises a first mounting member 10 and a second mounting member 20. The embodiment illustrated in FIG. 1 further comprises an elastic bellow 30, which may be mounted in an airtight manner to the first mounting member 10 and the second mounting member 20, respectively. The first mounting member 10, the second mounting member 20, and the elastic bellow 30 define an air spring volume 40. It should be noted that instead of the bellow 30, also a sealed telescopic tube arrangement may be used, even if not explicitly described in detail and not illustrated. The air spring arrangement 1 may be mounted to vehicle components 5. In particular, the first mounting member 10 may be mounted to a chassis of a vehicle (upper part of FIG. 1), wherein the second mounting member 20 may be mounted for example to an axle or to a wheel of a vehicle (lower part of FIG. 1). The air spring arrangement further comprises a height sensor 50, wherein the height sensor may for example be arranged within the air spring volume 40. The height sensor 50 may sense or detect the distance between the first mounting member 10 and the second mounting member 20. It should be understood, that the nominal distance may be calibrated with respect to the present geometries. The height sensor may be of any kind, like magnetic field based sensor technology, acoustic or ultrasound technology or even mechanical/potentiometer technology.

The air spring arrangement 1 further comprises a controllable valve, which may be for example a pneumatic valve 60. Further, the air spring arrangement 1 may comprise a position controllable drive, which may be for example a stepper motor 70. A position controllable drive 70 may be coupled to the controllable valve 60 so as to drive for example a valve piston 61, which is not illustrated in detail in FIG. 1. The controllable valve 60 is functionally arranged between the inside of the air spring volume 40 and the outside of the air spring volume 40. In other words, the controllable valve allows inserting or removing air from the air spring volume 40. The release of air from the air spring volume 40 may be conducted by opening a valve to release the air to the environment. To insert air to the air spring volume 40, pressured air may be provided via a respective pressured air line, wherein the connection between the pressured air line and the air spring volume 40 may be controlled by way of the controllable valve 60. It should be understood that the pressured air line is not illustrated in detail in FIG. 1. It should be understood that a single controllable valve 60 may be used for both, inserting and releasing air from the air spring volume. However, it should also be noted that two separate valves and also two separate position controllable drives 70 may be provided, one for releasing the air from the air spring volume 40 and one for inserting the air into the air spring volume 40, even if not explicitly described in detail and illustrated.

Figure 2:
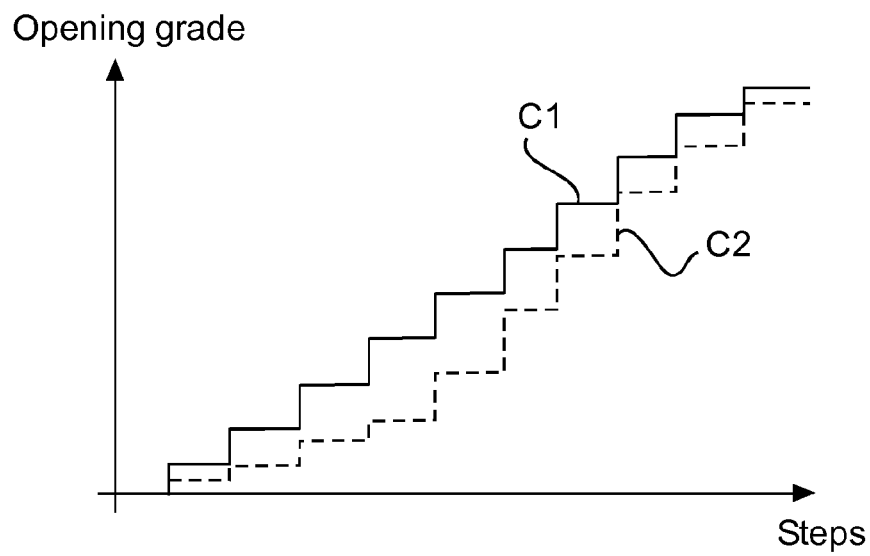
FIG. 2 illustrates a characteristic between an opening grade of the controllable valve and steps of a stepper motor according to an exemplary embodiment of the invention.

FIG. 2 illustrates an exemplary characteristic between an opening grade of the controllable drive and steps of for example a stepper motor as the position controllable drive 70. The steps represent for example a certain number of impulse for driving a stepper motor. FIG. 2 illustrates two different characteristics, the first characteristic C1 is a more linearly stepped characteristic between the opening grade and the number of steps for controlling the stepper motor, whereas the characteristic C2 has a characteristic which deviates from the linear characteristic of C1, like a progressive characteristic. It should be understood that also a wide variety of different characteristics may be applied, whereas the characteristic C1 and the characteristic C2 are of only exemplary nature. In particular, the characteristic may be adapted according to need. It should also be understood, that the characteristics do not have to be of a stepped nature, but may also be of a continuous nature, for example a straight line, or a curved characteristic, like a parabolic or a sinusoidal characteristic. In this respect, the characteristic is to be understood as a characteristic between an opening grade and a continuous position of a position controllable drive, e.g. when using a feedback loop dc drive.

Figure 3:
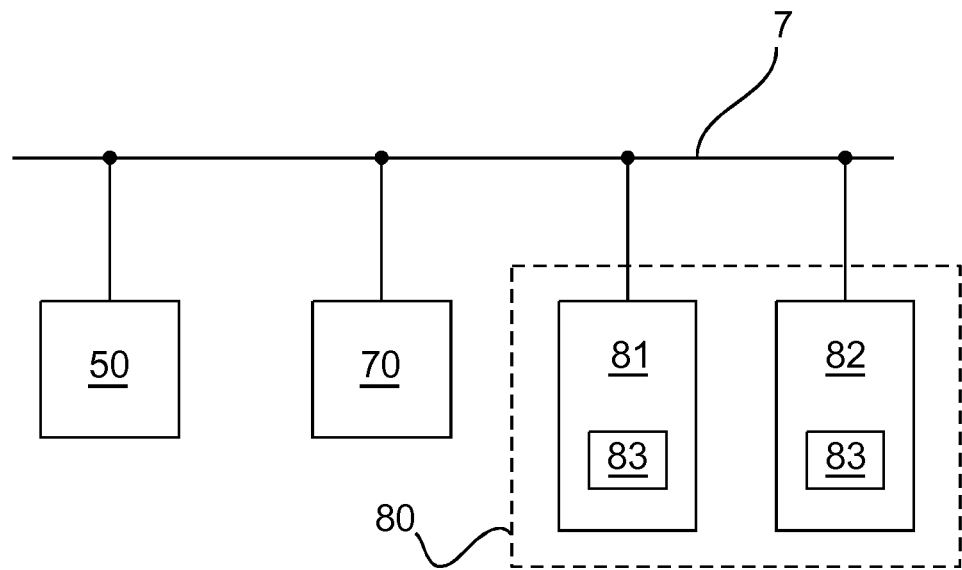
FIG. 3 illustrates a bus structure according to an exemplary embodiment of the invention.

FIG. 3 illustrates an exemplary embodiment of a control system for an air spring arrangement. The control system comprises a height sensor 50 and a position controllable drive 70. Both elements may be connected to a common bus 7, wherein the height sensor 50 as well as the position controllable drive member 70 have bus interfaces to be connected to bus 7. Also, a controlling device 80 may have a bus interface to be coupled to bus 7. The control device 80 may comprise a local controlling unit 81 and may also have a central controlling unit 82. The local controlling unit 81 may be provided and allocated to an air spring arrangement of one wheel, whereas the central controlling unit 82 may be allocated to a plurality of or all air spring arrangements or all wheels of a vehicle and provided somewhere in the vehicle. The purchasing entity may include an air spring 1 with a local controlling unit 81, a height sensor 50 and a drive 70 in combination with a valve 60 as well as a bus interface for coupling a central controlling unit (82). The plurality of local controlling units 81, even if only one local controlling unit is illustrated in FIG. 3, as well as the central controlling unit 82 together may be considered as the controlling device 80 for the vehicle. Both, the local controlling unit 81 as well as the central controlling unit 82 may have an estimation unit 83, which may be used to estimate the required amount of air and the required opening time and required opening grade of the pneumatic valve to be controlled. The entire system for an entire vehicle will be described with respect to FIG. 4.

Figure 4:
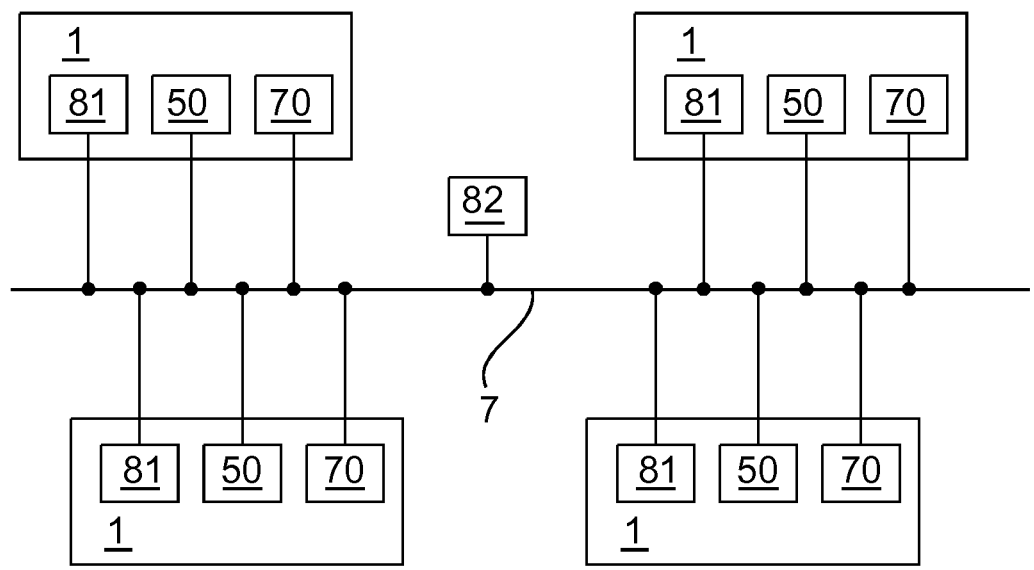
FIG. 4 illustrates the general structure of several elements of a vehicle with respect to a central bus according to an exemplary embodiment of the invention.

FIG. 4 illustrates the entire system of a vehicle, with the exemplary embodiment of four air spring arrangements. Each of the height sensors 50, the position controllable drives 70, and the local controlling units 81 may be coupled to a data bus 7. Also, the central controlling unit 82 may be coupled to the data bus 7, so that the local controlling units 81 as well as the central controlling unit 82 may receive the sensed values of the respective height sensors 50 and thus based on respective set values may control the position controllable drives 70 of each of the air spring arrangements 1. It should be understood, that the local controlling unit may conduct a local control, for example maintaining a particular level of the air spring arrangement according to an unsymmetrical and uneven load of the vehicle. In addition, the central controlling unit 82 may control the stroke of the respective air spring arrangements according to dynamic driving conditions, like for example road conditions or other impacts onto the entire vehicle. It should be noted that between the local controlling units 81 and the central controlling unit 82, a priority may be established for controlling purposes.

Figure 5:
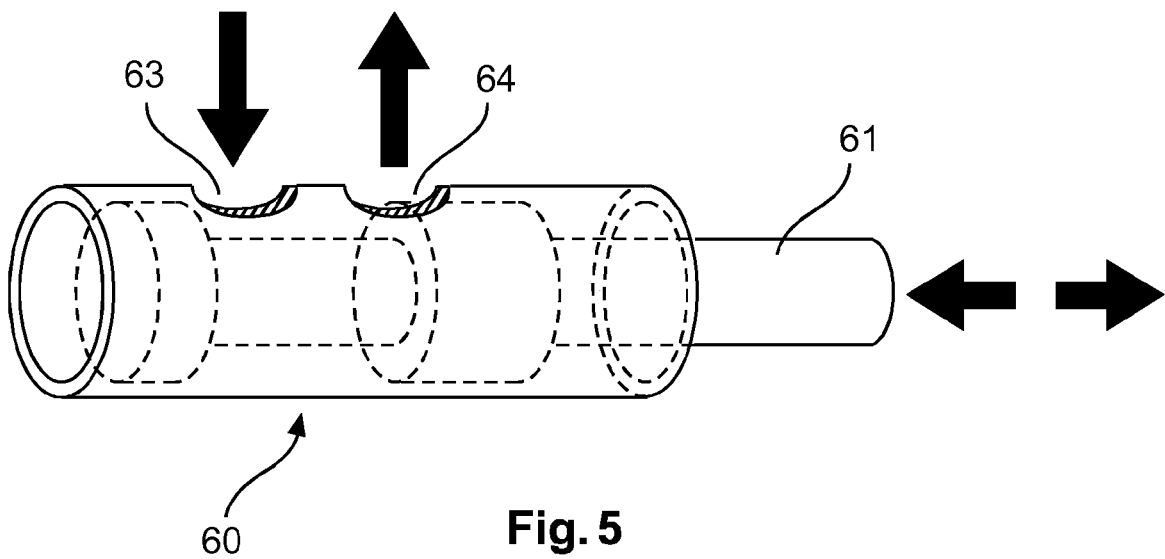
FIG. 5 illustrates a controllable valve having a linearly moved valve piston according to an exemplary embodiment of the invention.

FIG. 5 illustrates a controllable valve, in particular a pneumatic valve having a valve piston 61 which may be moved in linear direction. The pneumatic valve 60 may have an air inlet 63 and an air outlet 64. For releasing air, the air inlet 63 may be coupled to the air spring volume, whereas the air outlet 64 may be coupled to the environment, i.e. the outside of the air spring volume. This configuration will be used for releasing air from the air spring volume 40. When using the valve of FIG. 5 for increasing the pressure within the air spring volume, i.e. inserting air, the outlet 64 may be coupled to the air spring volume, i.e. the inside of the air spring volume, whereas the inlet 63 may be coupled to the environment, i.e. the outside of the air spring volume. The valve 60 may have a design allowing a reverse operation with respect to air flow, i.e. using the air inlet as air outlet and vice versa. Movement of the piston rod 61 in linear direction may open and close the conduit between the inlet and outlet, respectively, whereas the skilled person will adapt the cross-section of the inlet, the cross-section of the outlet, as well as the geometry of the valve piston 61 according to need and according to the required characteristic between the opening grade and the position of the valve piston 61.

The solution of FIG. 5 may be realized by for example a stepper motor which turns a spindle shaft. A nut may be placed onto the spindle shaft and will be pushed along the spindle shaft. This pushing and pulling motion of the nut is moving a rod or shaft. At the outer end of the shaft, there is a slider which is placed inside a tube. The valve piston is opening and closing the holes in the wall of the tube as the inlets and the outlets 63, 64. Such a tube may be considered as a pneumatic valve tube. Depending on where these holes are in axial direction or this pneumatic tube, air passes are opened or closed. This design allows building and realizing many different pneumatic valve functions.

Figure 6:
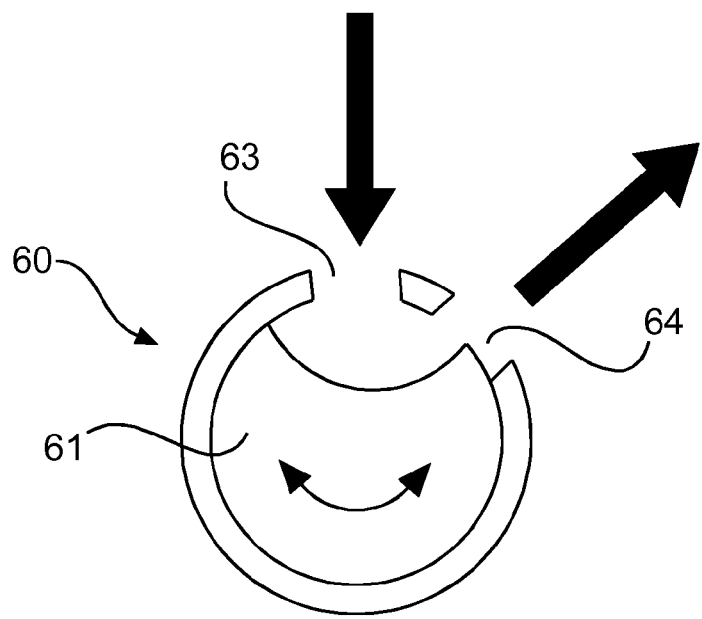
FIG. 6 illustrates a controllable valve having a rotatable valve piston according to an exemplary embodiment of the invention.

FIG. 6 illustrates a cross-sectional view of a valve tube, where the valve piston 61 is rotated so as to open and close the inlets 63 and outlets 64. According to the rotational position of the valve piston 61, the opening grade of the valve 60 can be varied.

This can be realized for example by a simple tooth-wheel gear design, wherein the rotation of for example a stepper motor drive shaft will be converted into a slow rotation of the piston shaft in the pneumatic valve tube. Depending on the shape of the valve piston, holes that are placed around the wall of the valve tube 60 will be closed and opened and with this, various air passage connections can be created and blocked. It should be understood that also a combination of a rotational and linear movement of the valve piston 61 may be applied. i.e. a combination of FIGS. 5 and 6.

It should be noted, that instead of a stepper motor also a standard electromotor can be used, when providing for example a position feedback in form of a position sensor. When using a continuously operating electromotor, like for example a DC powered motor, it may be helpful to integrate a linear position sensor into the piston of the pneumatic valve.

It should be noted that the invention may not only be applied to road vehicles, but also to other vehicles and other applications, like for example workshop drilling and cutting machines and other applications, where a smooth and effective controlling of air spring arrangement is required.

It should be noted that the term "comprising" does not exclude other elements or steps, and that "a" or "an" does not exclude a plurality. Also elements described in association with the different embodiments may be combined. It should be noted that the reference signs in the claims shall not be construed as limiting the scope of the claims.

This application claims benefit of European Patent Application Serial No. EP 13154685.5, filed on Feb. 8, 2013. While certain representative embodiments and details have been shown for the purpose of illustrating the subject invention, it will be apparent to those skilled in this art that various changes and modifications can be made therein without departing from the scope of the subject invention.

What is claimed is:

1. An air spring arrangement comprising:
a first mounting member,
a second mounting member,
an air spring volume,
a height sensor,
a controllable valve,
a position controllable drive, wherein the position controllable drive is a stepper motor and the controllable valve is a stepper motor driven pneumatic valve,
wherein the stepper motor is configured to be controlled with a controlling signal such that an opening grade of the stepper motor driven pneumatic valve can be determined based on the controlling signal,
wherein the first mounting member and the second mounting member are arranged so as to mount the air spring volume to corresponding vehicle members,
wherein the height sensor is arranged so as to sense a distance between the first mounting member and the second mounting member,
wherein the controllable valve is arranged so as to connect the air spring volume with an environment outside of the air spring volume,
wherein the position controllable drive is arranged so as to drive the controllable valve (60) with respect to an opening grade of the controllable valve,
wherein the controllable valve in combination with the position controllable drive has a self-holding characteristic, such that in case of absence of power the controllable valve maintains any opening grade adjusted before the absence of power, and
wherein the position controllable drive is controlled based on the sensed distance (d) between the first mounting member and the second mounting member.

2. The air spring arrangement according to claim 1, wherein a characteristic (C1, C2) between the position controllable drive and the opening grade of the controllable valve is predefined.

3. The air spring arrangement according to claim 1, wherein the height sensor and the position controllable drive each comprise an inter-compatible bus interface to be connected to a control unit.

4. The air spring arrangement according to claim 2, wherein the height sensor and the position controllable drive each comprise an inter-compatible bus interface to be connected to a control unit.

5. The air spring arrangement according to claim 1, further comprising a controlling device, wherein the controlling device is adapted for controlling the position controllable drive based on the distance sensed by the height sensor and a set value.

6. The air spring arrangement according to claim 5, wherein the controlling device, comprises a local controlling unit being allocated to the air spring arrangement and a central vehicle controlling unit being allocated to a plurality of air spring arrangements of a vehicle, wherein the local controlling unit is adapted to control the position controllable drive based on local set values and the central vehicle controlling unit is adapted to control the position controllable drive based on central set values.

7. The air spring arrangement according to claim 1, further comprising an elastic bellow, wherein the first mounting member, the second mounting member and the elastic bellow define the air spring volume.

8. The air spring arrangement according to claim 1, wherein the controllable valve and the position controllable drive together are mounted to one of the first mounting member and the second mounting member.

9. The air spring arrangement according to claim 1, wherein the position controllable drive and the controllable valve are coupled such that the position controllable drive generates a linear movement of a valve piston of the controllable valve.

10. The air spring arrangement according to claim 1, wherein the position controllable drive and the controllable valve are coupled such that the position controllable drive generates a rotational movement of a valve piston of the controllable valve.

11. The air spring arrangement according to claim 5, wherein the controlling device comprises an estimation unit being adapted for estimating a required control pattern for controlling the position, wherein the controlling device is adapted to control the position controllable drive based on an estimated control pattern so as to avoid control iterations.

12. The air spring arrangement according to claim 11, wherein the estimation unit is adapted to self-learning from previously estimated control patterns.

13. The air spring arrangement according to claim 11, further comprising a data bus, wherein at least two of the height sensor, the position controllable drive and the controlling device are communicatively connected to the data bus.

14. An air spring system for a vehicle, the air spring system comprises a plurality of air spring arrangements according to claim 1, wherein the plurality of air spring arrangements with respect to at least one parameter are commonly controlled.

15. An air spring system for a vehicle, the air spring system comprises a plurality of air spring arrangements according to claim 2, wherein the plurality of air spring arrangements with respect to at least one parameter are commonly controlled.

16. An air spring system for a vehicle, the air spring system comprises a plurality of air spring arrangements according to claim 4, wherein the plurality of air spring arrangements with respect to at least one parameter are commonly controlled.

17. An air spring system for a vehicle, the air spring system comprises a plurality of air spring arrangements according to claim 6, wherein the plurality of air spring arrangements with respect to at least one parameter are commonly controlled.

18. An air spring system for a vehicle, the air spring system comprises a plurality of air spring arrangements according to claim 12, wherein the plurality of air spring arrangements with respect to at least one parameter are commonly controlled.

19. The air spring system for a vehicle according to claim 14, further comprising a data bus, wherein height sensors, position controllable drives, local controlling units and a central controlling unit are communicatively connected to the data bus, wherein the central controlling unit is adapted to commonly control the plurality of air spring arrangements with respect to at least one parameter, and the local controlling units are adapted to locally control the plurality of air spring arrangements with respect to at least one parameter.

* * * * *